(12) United States Patent
Wakui

(10) Patent No.: US 9,387,685 B2
(45) Date of Patent: Jul. 12, 2016

(54) IMAGE FORMATION DEVICE, METHOD, PROGRAM, AND FORMED IMAGE

(71) Applicant: FUJIFILM Corporation, Tokyo (JP)

(72) Inventor: Takashi Wakui, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/807,891

(22) Filed: Jul. 24, 2015

(65) Prior Publication Data

US 2015/0328901 A1 Nov. 19, 2015

Related U.S. Application Data

(63) Continuation of application No. PCT/JP2014/051210, filed on Jan. 22, 2014.

(30) Foreign Application Priority Data

Feb. 4, 2013 (JP) ................................ 2013/019776

(51) Int. Cl.
*B41J 2/21* (2006.01)
*H04N 1/405* (2006.01)
*H04N 1/40* (2006.01)

(52) U.S. Cl.
CPC ............... *B41J 2/2121* (2013.01); *H04N 1/405* (2013.01); *H04N 1/4055* (2013.01); *H04N 1/40087* (2013.01)

(58) Field of Classification Search
None
See application file for complete search history.

(56) References Cited

U.S. PATENT DOCUMENTS

| 5,864,406 A * | 1/1999 | Isaka .................... H04N 1/4056 347/131 |
| 6,328,404 B1 * | 12/2001 | Fujimori ................ B41J 2/2132 347/15 |
| 2005/0162704 A1 * | 7/2005 | He et al. ....................... 358/3.06 |

(Continued)

FOREIGN PATENT DOCUMENTS

| EP | 1558017 | 7/2005 |
| EP | 1662770 | 5/2006 |
| JP | 4375050 | 12/2009 |

OTHER PUBLICATIONS

"Written Opinion of the International Searching Authority of PCT/JP2014/051210", this report contains the following items: Form PCT/ISA237(cover sheet), PCT/ISA237(Box No. 1), PCT/ISA237(Box No. V), mailed on Apr. 28, 2014, which is English translation of "Written Opinion of the International Searching Authority", pp. 1-6.

(Continued)

*Primary Examiner* — Stephen Meier
*Assistant Examiner* — John P Zimmermann
(74) *Attorney, Agent, or Firm* — Jianq Chyun IP Office

(57) ABSTRACT

There are provided an image formation device, an image formation method, a program, and an image forming product capable of preventing noise and granularity of an image from deteriorating even when dots with a plurality of dot sizes are arranged to be aggregated. When a continuous tone image signal is a signal which indicates a tint image, at least one of dot aggregation portions 16, 18, 68, and 72 is formed through arrangement for aggregation of dots 14 (dots 14L and 14S) with two or more dot sizes, on a part of dot images 10, 12, 66, and 70 which are indicated by dot image signals. In addition, the dot aggregation portions 16, 18, 68, and 72 are formed through arrangement for non-aggregation of the dots 14 (dots 14L) with at least one dot size.

21 Claims, 20 Drawing Sheets

(56) References Cited

U.S. PATENT DOCUMENTS

| | | | | |
|---|---|---|---|---|
| 2006/0125865 A1* | 6/2006 | Shibata | ............... | B41J 2/2054 347/15 |
| 2006/0256168 A1* | 11/2006 | Einat | ............... | B41J 2/14 347/85 |
| 2008/0180475 A1* | 7/2008 | Eldar et al. | ............... | 347/13 |
| 2012/0206526 A1* | 8/2012 | Asai | ............... | B41J 2/22056 347/15 |
| 2014/0009520 A1* | 1/2014 | Hasegawa | ............... | B41J 2/2132 347/9 |

OTHER PUBLICATIONS

"'International Search Report (Form PCT/ISA/210)", mailed on Apr. 28, 2014, with English translation thereof, pp. 1-4.

Search Report of European Counterpart Application, issued on Jan. 4, 2016, p. 1-p. 10.

* cited by examiner

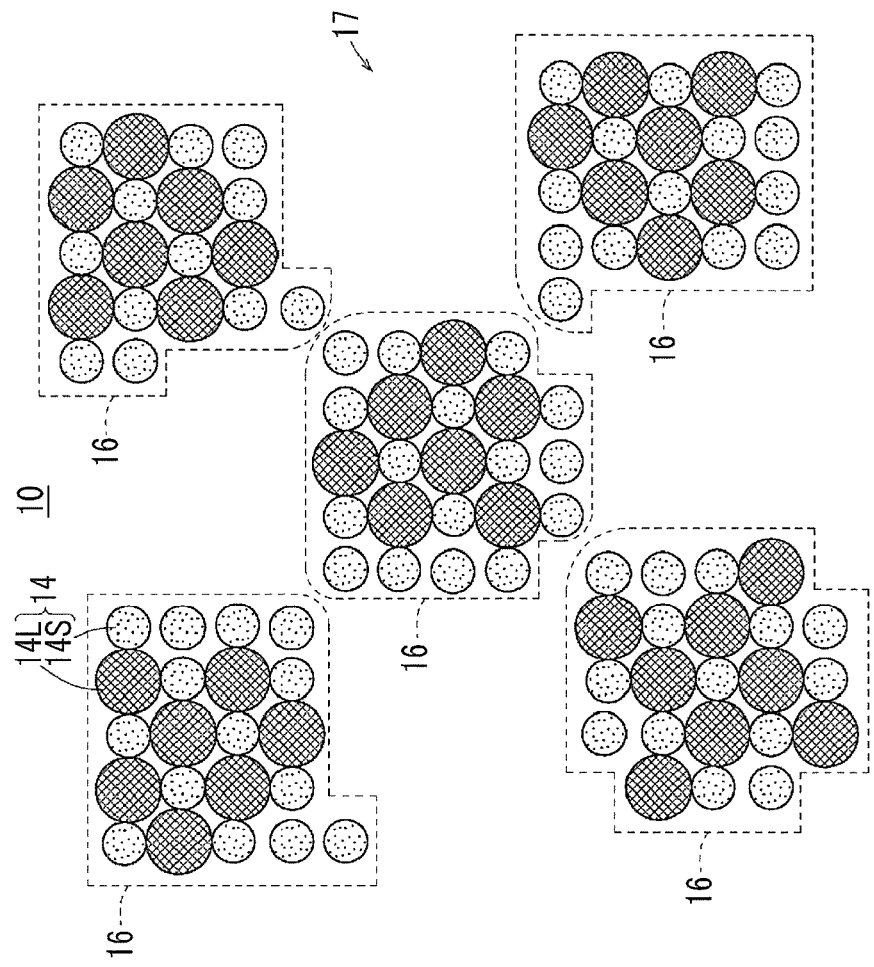

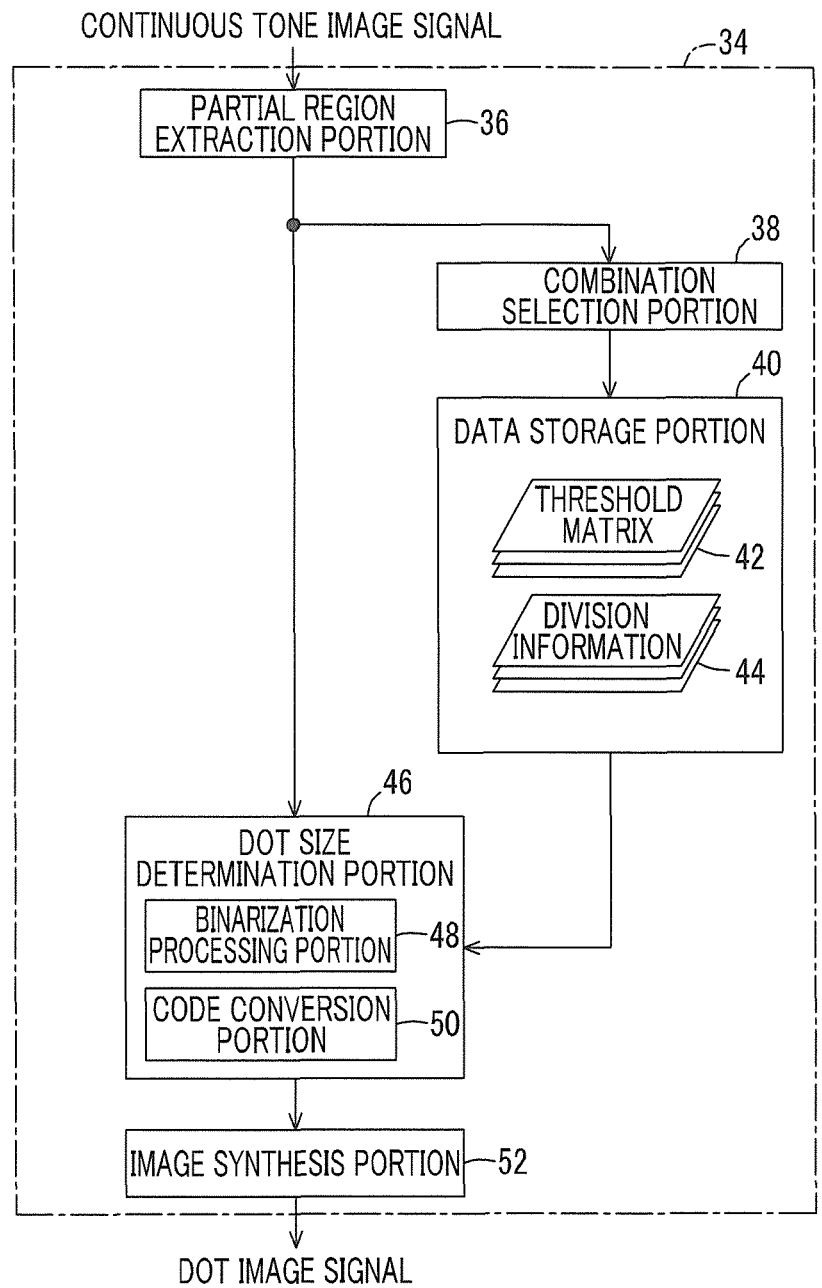

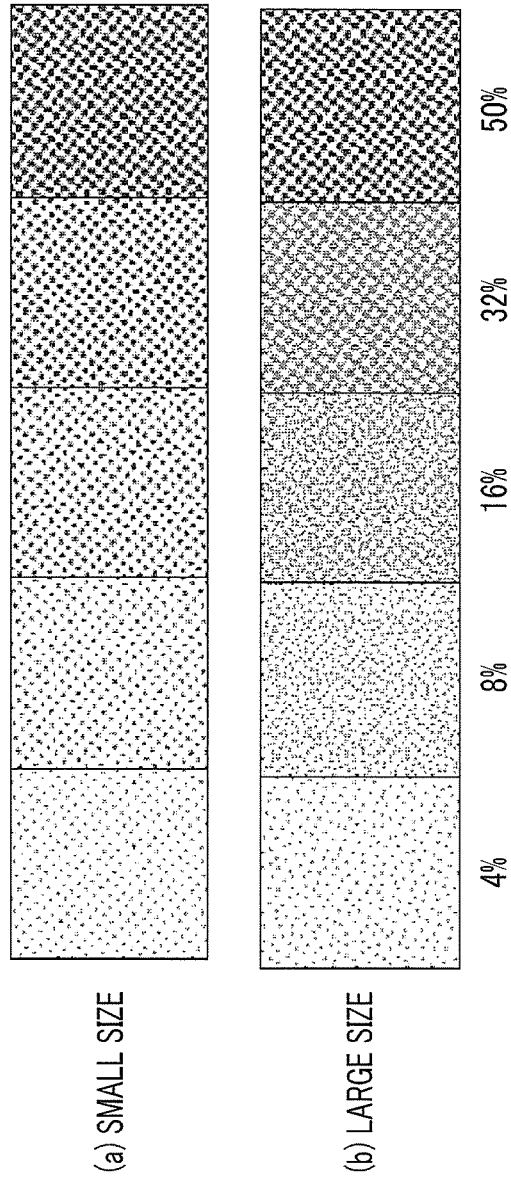

66

(COMPARATIVE EXAMPLE)

FIG. 12A (COMPARATIVE EXAMPLE) 2a
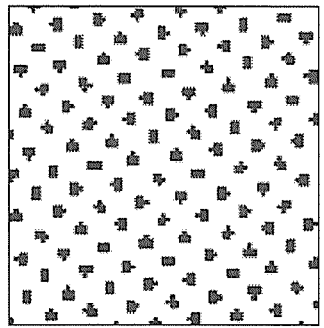
FIG. 12B (COMPARATIVE EXAMPLE) 2b
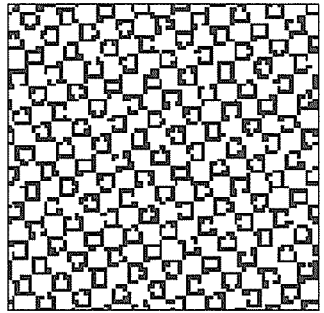

(COMPARATIVE EXAMPLE)

(COMPARATIVE EXAMPLE)
4b (COMPARATIVE EXAMPLE)
4a (COMPARATIVE EXAMPLE)

(COMPARATIVE EXAMPLE)
2

(COMPARATIVE EXAMPLE)
4

IMAGE FORMATION DEVICE, METHOD, PROGRAM, AND FORMED IMAGE

CROSS REFERENCE TO RELATED APPLICATIONS

This application is a Continuation of PCT International Application No. PCT/JP2014/051210 filed on Jan. 22, 2014, which claims priority under 35 U.S.C §119(a) to Japanese Patent Application No. 2013-019776 filed on Feb. 4, 2013, all of which are hereby expressly incorporated by reference into the present application.

BACKGROUND OF THE INVENTION

1. Field of the Invention

The present invention relates to an image formation device, an image formation method, a program, and an image forming product for forming an image formed of dots in which multiple dot sizes are mixed.

2. Description of the Related Art

In recent years, with the rapid progress of an ink jet technique, color and large size printing, in which high speed and high image quality are compatible, has been realized by ink-jet-type image formation devices. This kind of device is used in, particularly, a wide field in application to signs and display, and is also applicable to printing of, for example, a storefront point of purchase (POP), wall poster, outdoor advertising, a signboard, and the like.

In this ink jet type, liquid droplets of a plurality of types of ink (for example, CMYK inks) are ejected onto a recording medium so as to form a plurality of dots, thereby obtaining printed matter. For example, when an image is formed using dots with different sizes, there have been proposed various halftoning techniques in which an increase in image quality and reduction in calculation processing amount are compatible.

JP4375050B (claim 1, [0152] to [0155], FIG. 26, etc.) has proposed a method of determining dot sizes for pixels turned on in accordance with sizes of threshold values at positions corresponding to the pixels from the results of binarization processing using threshold matrices. More specifically, there has been proposed a method of sequentially allocating increasing dot sizes in an ascending order of threshold values (order values) when the number of large-size dots, the number of middle-size dots, and the number of small-size dots are specified.

SUMMARY OF THE INVENTION

Conventionally, for such a type of image formation device, there has been a halftone design for improving visibility by enhancing dispersibility and irregularity of dots. A concept of this design is also applied to a single-pass-type image formation device which uses recording heads (hereinafter referred to as line heads) having a plurality of nozzles arranged along a width direction of a recording medium.

However, according to a keen examination of inventors of the present invention, in contrast to the above design concept, the following has been found. For example, by aggressively aggregating dots in a gray scale range of low concentration to medium concentration, robustness against specific stripe unevenness is enhanced in the single-pass-type image formation device. The "specific stripe unevenness" is unevenness of dark or light stripes which extend in a transport direction. The unevenness is caused when landing positions of liquid droplets ejected from the nozzles deviate from the target positions in the width direction of a recording medium.

Therefore, for example, when a so-called aggregation-type threshold matrix described in JP4375050B (claim 1, [0152] to [0155], FIG. 26, etc.) is applied, it is possible to obtain a dot image 2 (refer to FIG. 20A) or a dot image 4 (refer to FIG. 20B) in which dots are aggregated for each dot size. However, sizes of dot clusters for each dot size become large, and thus the shapes thereof are likely to be perceived by an observer. As a result, there is a problem that noise and graininess (granularity) of the image deteriorates.

The present invention has been made in order to solve the above-described problem, and its object is to provide an image formation device, an image formation method, a program, and an image forming product capable of preventing noise and granularity of an image from deteriorating even when dots with a plurality of dot sizes are arranged to be aggregated.

According to the present invention, there is provided an image formation device that forms an image formed of dots in which multiple dot sizes are mixed, the image formation device including a halftone processing section that generates a dot image signal, which indicates states of dots, by performing halftone processing on a continuous tone image signal which indicates the image, in which when the continuous tone image signal is a signal indicating a tint image, at least one dot aggregation portion is formed through arrangement for aggregation of dots with two or more dot sizes, on a part of a dot image which is indicated by the dot image signal, and the dot aggregation portion is formed through arrangement for non-aggregation of dots with at least one dot size of the two or more dot sizes.

As described above, at least one dot aggregation portion is formed through the arrangement for aggregation of the dots with two or more dot sizes, on a part of the dot image, and the dot aggregation portion is formed through the arrangement for non-aggregation of the dots with at least one dot size. Therefore, sizes of clusters of dots with at least one dot size become small, and thus the shapes thereof become unlikely to be perceived by an observer. Thereby, it is possible to reduce noise and graininess of an image even when dots with a plurality of dot sizes are arranged to be aggregated.

It is preferable that the arrangement for aggregation is arrangement in which the dots are aggregated so as to be adjacent at respective closest positions where the dots are closest, and the arrangement for non-aggregation is at least either of arrangement for semi-aggregation, in which the dots are aggregated so as to be adjacent at second closest positions where the dots are second closest relative to the closest positions, or arrangement for dispersion in which the dots are respectively present at positions farther than the second closest positions.

It is preferable that the dot aggregation portion is formed through the arrangement for dispersion of the dots with a largest dot size.

It is preferable that the dot aggregation portion is formed through the arrangement for aggregation of the dots with a smallest dot size.

It is preferable that, in the dot aggregation portion, the dots are arranged such that the smaller a dot size of the dots, the higher the aggregability of the dots, and the larger the dot size of the dots, the lower the aggregability of the dots.

It is preferable that the aggregability is defined on the basis of a power spectrum of a binary image in which whether or not each dot with a specific dot size in the dot image is present is represented by a binary value, and in the dot image, the dots are arranged such that the smaller a dot size of the dots, the lower a spatial frequency, which corresponds to a maximum value of the power spectrum, and the larger a dot size of the dots, the higher the spatial frequency.

It is preferable that the aggregability is defined on the basis of a power spectrum of a binary image in which whether or not each dot with a specific dot size in the dot image is present is represented by a binary value, and in the dot image, the dots are arranged such that the smaller a dot size of the dots, the lower a spatial frequency, which corresponds to a centroid of the power spectrum, and the larger a dot size of the dots, the higher the spatial frequency.

Further, it is preferable that the image formation device further includes: a recording head that forms dots with a plurality of dot sizes on a recording medium; and a head driving circuit that controls the recording head such that the recording head sequentially forms dots, on the basis of the dot image signal which is generated by the halftone processing section, under a condition where the recording medium is moved relative to the recording head.

According to the present invention, there is provided an image formation method for using an image formation device that forms an image formed of dots in which multiple dot sizes are mixed, the image formation method including generating a dot image signal, which indicates states of dots, by performing halftone processing on a continuous tone image signal which indicates the image, in which when the continuous tone image signal is a signal indicating a tint image, at least one dot aggregation portion is formed through arrangement for aggregation of dots with two or more dot sizes, on a part of a dot image which is indicated by the dot image signal, and the dot aggregation portion is formed through arrangement for non-aggregation of dots with at least one dot size.

According to the present invention, there is provided a program for causing an image formation device, which forms an image formed of dots in which multiple dot sizes are mixed, to execute generating a dot image signal, which indicates states of dots, by performing halftone processing on a continuous tone image signal which indicates the image, in which when the continuous tone image signal is a signal indicating a tint image, at least one dot aggregation portion is formed through arrangement for aggregation of dots with two or more dot sizes, on a part of a dot image which is indicated by the dot image signal, and the dot aggregation portion is formed through arrangement for non-aggregation of dots with at least one dot size.

According to the present invention, there is provided an image forming product, in which the image is formed on a recording medium by using any of the above-described image formation devices.

According to an image formation device, an image formation method, a program, and an image forming product of the present invention, at least one dot aggregation portion is formed through the arrangement for aggregation of the dots with two or more dot sizes, on a part of the dot image, and the dot aggregation portion is formed through the arrangement for non-aggregation of the dots with at least one dot size. Therefore, sizes of clusters of dots with at least one dot size become small, and thus the shapes thereof are unlikely to be perceived by an observer. Thereby, it is possible to prevent noise and graininess of an image from deteriorating even when dots with a plurality of dot sizes are arranged to be aggregated.

BRIEF DESCRIPTION OF THE DRAWINGS

FIG. 2 is a partially enlarged view of the dot image illustrated in FIG. 1A.

FIG. 4 is a functional block diagram of a halftone processing section illustrated in FIG. 3.

FIG. 7 is a schematic diagram visually illustrating dot patterns which are generated using different types of threshold matrix and correspond to gray levels.

FIG. 12A is a dot pattern illustrating positions of "small size" dots arranged in the dot image of FIG. 20A. FIG. 12B is a dot pattern illustrating positions of "large size" dots arranged in the dot image of FIG. 20A.

DESCRIPTION OF THE PREFERRED EMBODIMENTS

Hereinafter, an embodiment of an image formation method according to the present invention, which is remarkably suitable in terms of relationships between an image formation device, a program, and an image forming product for performing the method, will be described with reference to the accompanying drawings. In this specification, to form an image is referred to as "printing" in some cases.

[Shape Features of Dot Images 10 and 12]

Figure 1A:
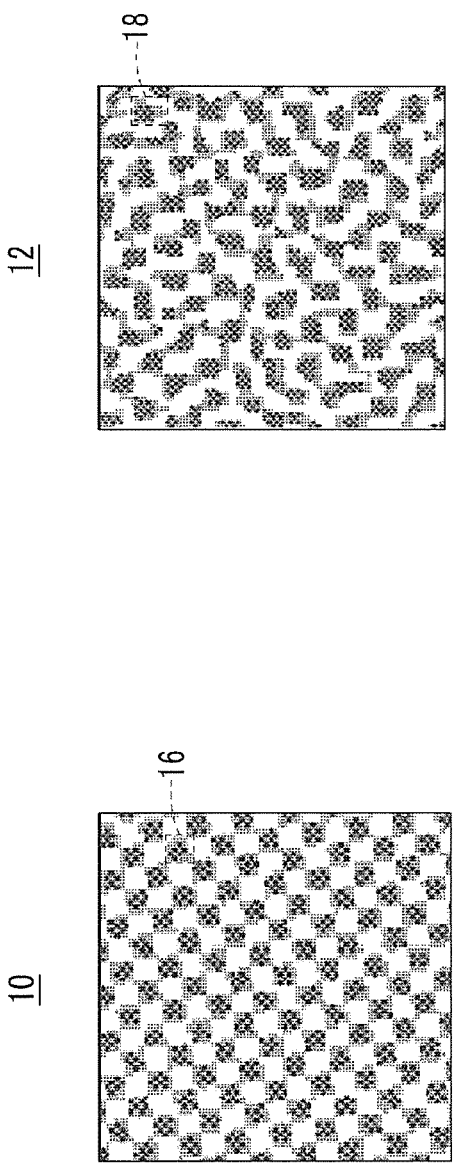
FIGS. 1A and 1B are schematic plan views of dot images which are respectively formed using image formation methods according to an embodiment.
Figure 1B:
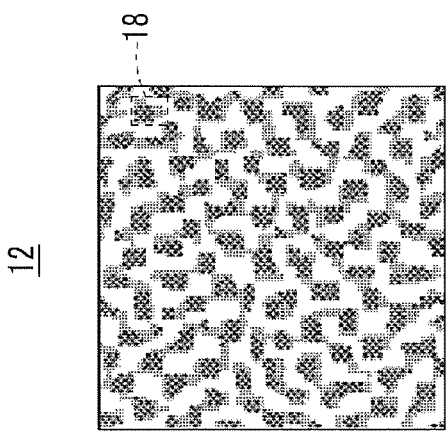

FIGS. 1A and 1B are schematic plan views of dot images 10 and 12 which are respectively formed using image formation methods according to an embodiment. Both of the dot images 10 and 12 are formed of dots 14 (FIG. 2) which have two kinds of size (hereinafter referred to as dot sizes) and have the same color. It should be noted that, for convenience of illustration of drawings, presence or absence of dots 14 and differences in kinds of dot size are represented by shading patterns.

The dot image 10 illustrated in FIG. 1A has a shape in which adjacent amplitude modulation (AM) halftone dots are connected to each other. The dot image 12 of FIG. 1B has a shape in which adjacent frequency modulation (FM) halftone dots are connected to each other. In addition, both of the dot images 10 and 12 are tint images (halftone image) having concentrations which are different in a micro view while having concentrations which are substantially the same in a macro view.

FIG. 2 is a partially enlarged view of the dot image 10 illustrated in FIG. 1A. In the dot image 10, dot aggregation portions 16 having substantially rectangular shapes are arranged in a checkered pattern (plaid pattern). Each dot aggregation portion 16 is formed of the dots 14 which are arranged to be aggregated.

Each dot 14 is classified as either of two kinds of dot size, specifically, either of "large size" dots 14L, or "small size" dots 14S. Focusing on the dot sizes for each dot aggregation portion 16, the "small size" dots 14S are arranged to be aggregated, and the "large size" dots 14L are arranged to be not aggregated (in other words, "to be semi-aggregated" to be described later).

Here, in the present specification, "(arranged) to be aggregated" means arrangement in which the dots 14 are aggregated so as to be adjacent at respective closest positions where the dots are closest. In an example of rectangular lattices arranged along a first direction and a second direction, "to be aggregated" corresponds to arrangement in which the dots 14 are connected along the first direction and/or the second direction. When the dots 14 are arranged in a lattice pattern, "the closest position" means a position where any one of the dots 14 is adjacent to other dots 14 in the vertical direction and the horizontal direction.

Meanwhile, in the present specification, "to be not aggregated" means a concept other than "to be aggregated", the concept including "to be semi-aggregated" and/or "to be dispersed". Here, "(arranged) to be semi-aggregated" means arrangement in which the dots 14 are aggregated so as to be adjacent at positions (that is, the second closest positions) where the dots are second closest relative to the closest positions. In the example of two-dimensionally arranged rectangular lattices, "to be semi-aggregated" corresponds to arrangement in which the dots 14L are connected in a checkered pattern as illustrated in FIG. 2. Further, "(arranged) to be dispersed" means arrangement in which the dots 14 are respectively present at positions farther than the second closest positions. When the dots 14 are arranged in a lattice pattern, "the second closest position" means a position where any one of the dots 14 is adjacent to other dots 14 in diagonal directions.

In the present drawing, the dot aggregation portions 16 are formed on a partial region of the entire region of the dot image 10. Hereinafter, a remaining portion, in which the dots 14 are not present, is referred to as a "non-printed portion 17". As described above, by variously changing not only a ratio between dot sizes present but also a proportion of an area of the non-printed portion 17, a macroscopic concentration gray scale in the dot image 10 can be represented. In addition, the dot aggregation portions 16 (refer to FIG. 1A) may have substantially the same size, and may be regularly formed. The dot aggregation portions 18 (refer to FIG. 1B) may have different sizes and may be irregularly formed.

[Configuration and Operation of Image Processing Section 20]

Figure 3:
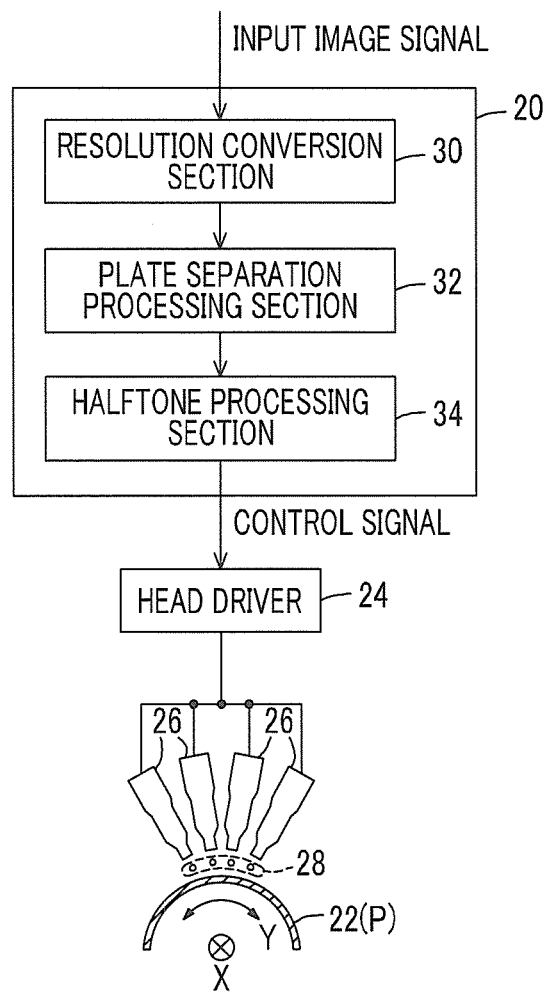
FIG. 3 is a schematic block diagram illustrating a main configuration for implementing the image formation methods according to the embodiment.

FIG. 3 is a schematic block diagram illustrating a main configuration for implementing the image formation method according to this embodiment.

An image processing section 20 as a main section of the present invention generates a control signal for forming a color image or a monochrome image, which is formed of a plurality of dots 14 (refer to FIG. 2), on a sheet 22 (recording medium), and supplies the control signal to a head driver 24 (head driving circuit) side. The control signal corresponds to a signal for causing at least one (four in this example of the drawing) recording heads 26 to eject liquid droplets 28.

Each recording head 26 is, for example, a line head having a plurality of nozzles arranged along the X direction. Each recording head 26 is able to form dots 14 with the plurality of dot sizes on the sheet 22. Examples of methods of controlling the dot sizes include a method of controlling an ejection amount of liquid droplets 28 and a method of controlling an ejection speed of the liquid droplets 28. For example, by increasing the ejection amount while keeping the ejection speed of liquid droplets 28 constant, it is possible to increase diameters of the dot sizes. Hereinafter, in this embodiment, it is assumed that each recording head 26 is able to form dots with two kinds of dot size of "large size" dots 14L and "small size" dots 14S.

The image processing section 20 basically includes a resolution conversion section 30, a plate separation processing section 32, and a halftone processing section 34. Hereinafter, an operation of the image processing section 20 will be schematically described. Here, an image signal (hereinafter referred to as an input image signal), which is input to the image processing section 20, is continuous tone data formed of a plurality of color channels. The input image signal may be, for example, 8-bit (256 gray levels per one pixel) RGB TIFF format data.

<1. Description of Operation of Resolution Conversion Section 30>

The resolution conversion section 30 converts a resolution of the input image signal into a resolution for an image formation device 100 (FIGS. 18 and 19) through image scaling processing to enlarge or reduce the image size. A first intermediate image signal, which is obtained at this time, has the same data definition as that of the input image signal, but the data sizes are different therebetween. Various well-known algorithms including interpolation calculation may be applied to the image scaling processing.

<2. Description of Operation of Plate Separation Processing Section 32>

The plate separation processing section 32 converts the first intermediate image signal, which is acquired from the resolution conversion section 30, into a device color signal which is compatible with the image formation device 100. Specifically, the plate separation processing section 32 reads and refers to one of the plurality of stored plate separation tables, thereby converting a RGB color signal into a CMYK color signal. When the plate separation tables include shading tables for separating a deep color and a light color, the plate separation processing section 32 further divides (separates) the device color signal for a specific color channel (for example, cyan, magenta) into signals for color channels of colors similar thereto.

A second intermediate image signal, which is obtained at this time, corresponds to a device color signal (a continuous tone image signal; refer to FIG. 4) with continuous tone. For example, the second intermediate image signal is separated into device color signals for four color channels of yellow (Y), magenta (M), cyan (C), and black (K).

<3. Description of Operation of Halftone Processing Section 34>

The halftone processing section 34 performs halftone processing on the second intermediate image signal which is acquired from the plate separation processing section 32, thereby converting the signal into an image signal (hereinafter, a dot image signal) which indicates states of dots 14 (FIG. 2). The dot image signal is multi-value data for each color for chronologically controlling the ejection amount of liquid droplets 28 or execution (on or off) of the ejection operation. For example, a multi-value level "0" indicates an off-state, a multi-value level "1" indicates an on-state (small size), and a multi-value level "2" indicates an on-state (large size).

Thereafter, the image processing section 20 completes the entire desired image processing so as to generate a control signal, and subsequently the control signal is supplied to the head driver 24 side. Then, each recording head 26 ejects liquid droplets 28 in accordance with ejection control through the head driver 24. By sequentially transporting the sheets 22 in a direction of an arrow Y in accordance with the ejection operation, a desired image (that is, the dot image 10 or the like) is formed on the sheet 22. Thereby, an image forming product P is obtained.

[Configuration and Operation of Halftone Processing Section 34]

FIG. 4 is a functional block diagram of a halftone processing section 34 illustrated in FIG. 3. The halftone processing section 34 includes a partial region extraction portion 36, a combination selection portion 38, a data storage portion 40, a dot size determination portion 46, and an image synthesis portion 52. In this example of the drawing, the data storage portion 40 respectively stores a plurality of types of threshold matrix 42 and at least one type of division information 44. Further, the dot size determination portion 46 includes a binarization processing portion 48 and a code conversion portion 50.

Figure 5B:
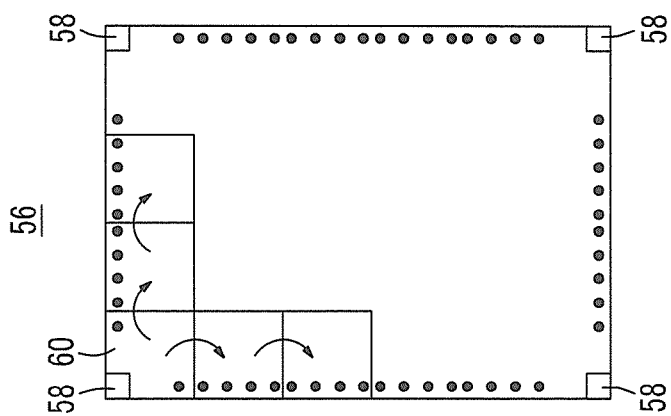
FIG. 5B is a first explanatory diagram of the halftone processing prescribed by a systematic dithering method.
Figure 5A:
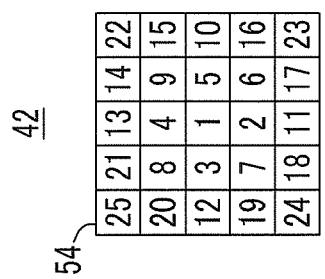
FIG. 5A is a schematic diagram illustrating threshold values of a threshold matrix.

FIG. 5A is a schematic diagram illustrating threshold values of the threshold matrix 42. The threshold matrix 42 is formed of a total of 25 matrix elements 54 arranged in a matrix of 5×5 in the row and column directions. The threshold value of each matrix element 54 is any of integers in a range of "1 to 25", and is a value which is unique in the range. Consequently, by applying a systematic dithering method using the threshold matrix 42 to the continuous tone image signal, 26 gray levels can be represented.

FIG. 5B is a first explanatory diagram of the halftone processing prescribed by a systematic dithering method. In the image region 56 having a rectangular shape, a plurality of pixels 58 is two-dimensionally disposed. In this embodiment, the threshold matrices 42 are sequentially applied to the continuous tone image signal having the image region 56, thereby executing halftone processing.

<1. Description of Operation of Partial Region Extraction Section 36>

The partial region extraction portion 36 sequentially extracts partial regions 60 (FIG. 5B) which are parts of an image region 56 (the same drawing) indicated by the continuous tone image signal. Then, the partial region extraction portion 36 respectively supplies partial images, which indicate the partial regions 60, to the combination selection portion 38 and the dot size determination portion 46.

<2. Description of Operation of Combination Selection Portion 38>

The combination selection portion 38 selects two or more combinations in a data group stored in the data storage portion 40 in accordance with a gray level indicated by the partial image. The gray level is specified on the basis of a statistical amount for pixel values of the plurality of pixels 58 and/or a pixel value of one pixel 58 present in the partial region 60. Here, the selected combinations include at least two types of threshold matrix 42.

FIG. 7 is a schematic diagram visually illustrating dot patterns which are generated using different types of threshold matrix 42 and correspond to gray levels. The gray levels (dot %) of the dot patterns are 4%, 8%, 16%, 32%, and 50% in order from the left side.

The upper side of the present drawing shows processing results using the threshold matrix 42 which is a dot aggregation type (typical AM dot). The lower side of the present drawing shows processing results using the threshold matrix 42 which is locally a dot dispersion type (green noise type). In addition, in these threshold matrices 42, arrangement of the threshold values is the same in the range of the dot % of 50 to 100%. Therefore, the generated dot patterns are also the same.

<3. Description of Operation of Dot Size Determination Portion 46>

The dot size determination portion 46 determines states (presence or absence and a dot size) of the dot 14 for each pixel 58 which is present in the extracted partial region 60.

[1] First, the binarization processing portion 48 performs binarization processing using the threshold matrix 42 on the partial image which is supplied from the partial region extraction portion 36.

Figure 6:
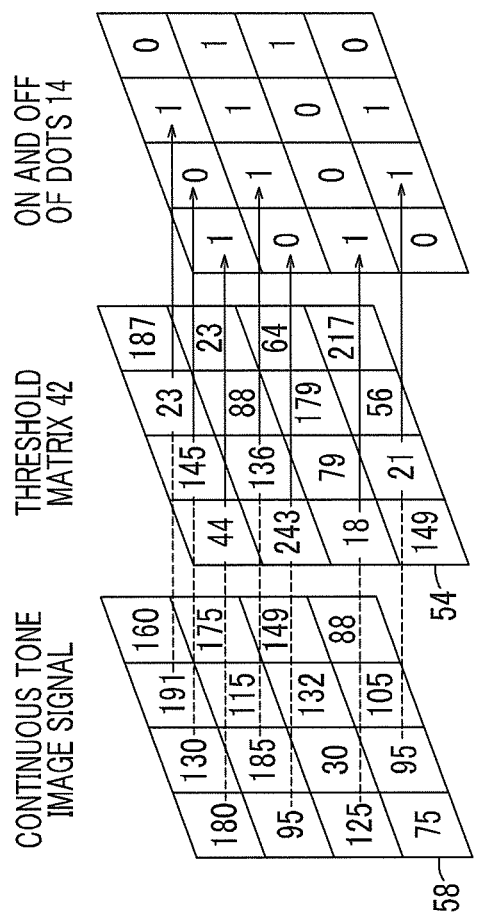
FIG. 6 is a second explanatory diagram of the halftone processing prescribed by the systematic dithering method.

FIG. 6 is a second explanatory diagram of the halftone processing prescribed by the systematic dithering method. A concept of binarization using the threshold matrix 42 (mask pattern) having a Bayer array form is illustrated as an example. Respective addresses in the continuous tone image signal are associated with the respective matrix elements 54 of the threshold matrix 42. Then, a pixel value of each target pixel 58 is compared with a threshold value of each target matrix element 54. If the pixel value is smaller than the threshold value, "0 (off-state)" is assigned to the pixel, otherwise "1 (on-state)" is assigned thereto. In such a manner, the number of gray levels of the image signal is converted from multiple values into binary values.

[2] Subsequently, the code conversion portion 50 determines whether or not the threshold values corresponding to the positions of the on-state pixels 58 belong to the plurality of divisions. Here, the division information 44 is information for classifying the whole range of the threshold values covered by the threshold matrix 42 into the plurality of divisions. For example, when a set of boundary values of "9" and "21" is given as the division information 44, the entire range of the threshold value is classified into a division of "1 to 9", a division of "10 to 21", and a division of "22 to 25".

[3] Next, the code conversion portion 50 determines which of the divisions each of the threshold values belongs to, for each combination selected by the combination selection portion 38. Thereafter, the code conversion portion 50 determines the dot sizes of the pixels 58 in accordance with the combination as to whether or not the threshold values belong to two or more divisions. In particular, through various combinations of the plurality of types of threshold matrix 42, it is possible to achieve distribution characteristics of the dots 14 in which two or more different dithering properties are made to be compatible.

[4] The halftone processing section 34 sequentially repeats steps [1] to [3], and extracts all the partial regions 60 from the image region 56, thereby determining the dot sizes for all the pixels 58 which are present in the partial region 60.

<4. Description of Operation of Image Synthesis Portion 52>

The image synthesis portion 52 generates the dot image signal by synthesizing the partial images which are sequentially obtained. Specifically, multi-value data pieces (for example, ternary data pieces), which are associated with the states of the dots 14, are respectively disposed to maintain a positional relationship between the image region 56 and the partial regions 60 illustrated in FIG. 5B.

[Example of Processing Results]

As described above, the halftone processing section 34 performs halftone processing on the continuous tone image signal which indicates an image, thereby generating the dot image signal which indicates the states of the dots 14. Hereinafter, features of the dot image signal when the continuous tone image signal is a signal indicating a tint image will be described with reference to FIGS. 8A to 8C.

An image region 62, which is indicated by the dot image signal, has the same image size as the image region 56 (FIG. 5B). For convenience of description, FIGS. 8A to 8C illustrate a part of the image region 62.

Figure 8A:
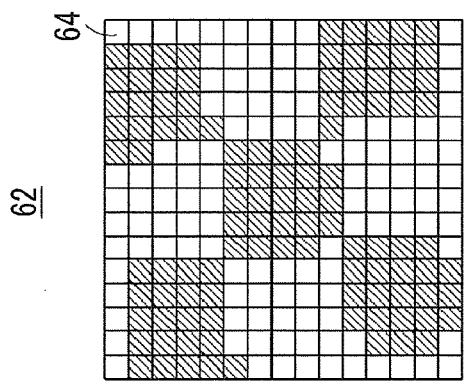
FIG. 8A is a schematic diagram illustrating positions of dots arranged in the dot image of FIG. 2.

As illustrated in FIG. 8A, the hatched locations indicate positions of pixels 64 of which pixel values are not "0". Consequently, the pixels 64 arranged to be aggregated indicate presence of the dot aggregation portions 16 illustrated in FIG. 2.

Figure 8B:
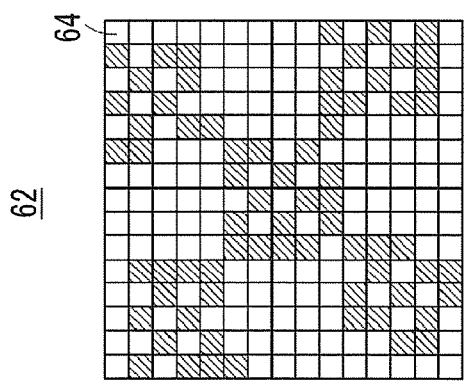
FIG. 8B is a schematic diagram illustrating positions of "small size" dots arranged in the dot image of FIG. 2.

As illustrated in FIG. 8B, the hatched locations indicate positions of pixels 64 of which pixel values are "1". Consequently, the pixels 64 arranged to be aggregated indicate presence of the "small size" dots 14S illustrated in FIG. 2.

Figure 8C:
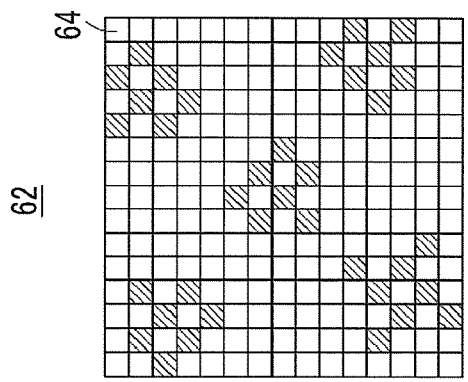
FIG. 8C is a schematic diagram illustrating positions of "large size" dots arranged in the dot image of FIG. 2.

As illustrated in FIG. 8C, the hatched locations indicate positions of pixels 64 of which pixel values are "2". Consequently, the pixels 64 arranged to be dispersed indicate presence of the "large size" dots 14L illustrated in FIG. 2.

The image processing section 20 completes the entire desired image processing so as to generate a control signal, and subsequently the control signal is supplied to the head driver 24 side. Then, each recording head 26 ejects liquid droplets 28 in accordance with ejection control through the head driver 24. By sequentially transporting the sheets 22 in a direction of an arrow Y (FIG. 3) in accordance with the ejection operation, a desired image (the dot image 10 of FIG. 1A) is formed on the sheet 22.

It should be noted that it is possible to form various dot images including the dot image 12 of FIG. 1B on the sheet 22 by appropriately changing contents of the processing in the halftone processing section 34.

[Another Example of Processing Results]

Subsequently, another example of the image processing results will be described with reference to FIGS. 9 to 10B.

Figure 9:
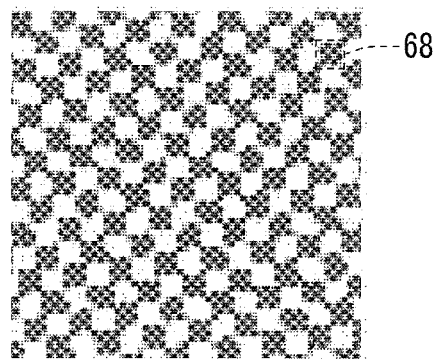
FIG. 9 is a schematic plan view of a dot image according to another example.

FIG. 9 is a schematic plan view of a dot image 66 according to another example. In the present drawing, in a manner similar to those of FIGS. 1A and 1B, presence or absence of dots 14 and differences in kinds of dot size are represented by shading patterns. More specifically, the deep color portions indicate the "large size", the light color portions indicate the "small size", and the remaining portions indicate the "off-state" (no dots).

In the dot image 66 illustrated in FIG. 9, dot aggregation portions 68 having substantially rectangular shapes are arranged in a checkered pattern (plaid pattern). Focusing on each dot aggregation portion 68, the "small size" dots 14S (FIG. 2) are arranged to be semi-aggregated, and the "large size" dots 14L (FIG. 2) are arranged to be semi-aggregated. As described above, in the dot aggregation portion 68, the dots 14 with the plurality of dot sizes may be arranged to be not aggregated.

Then, description will be given of an exemplary case where dots 14 with three kinds of dot size of a "large size", a "middle size", and a "small size" are formed, with reference to FIGS. 10A and 10B.

In both a dot image 6 (FIG. 10A) and a dot image 70 (FIG. 10B), rectangular halftone dots are regularly arranged. Further, the portions, which are represented by four shades, in the dot images 6 and 70 respectively correspond to the "large size", the "middle size", the "small size" and the "off-state", in order from the darkest to the lightest.

Figure 10A:
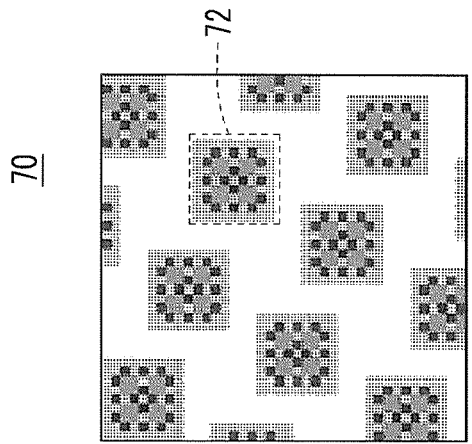
FIG. 10A is a schematic plan view of a dot image according to a comparative example.

FIG. 10A is a schematic plan view of the dot image 6 according to a comparative example. The dot image 6 is described in the method of JP4375050B (claim 1, [0152] to [0155], FIG. 26, etc.), and is an image which is obtained by applying the threshold matrix 42 illustrated in FIG. 5A. As can be seen from the drawing, in a dot aggregation portion 8, all the "large sizes", the "middle sizes", and the "small sizes" are arranged to be aggregated. In this case, sizes of dot clusters for each dot size become large, and thus the shapes thereof are likely to be perceived by an observer. As a result, noise and graininess of the image deteriorates.

Figure 10B:
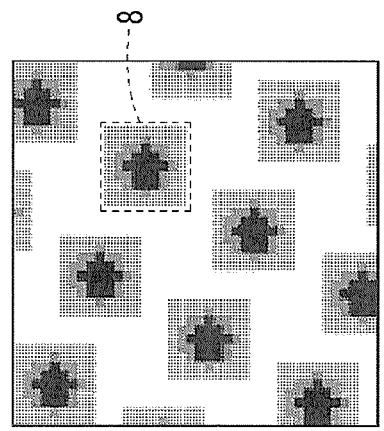
FIG. 10B is a schematic plan view of a dot image according to the embodiment.

FIG. 10B is a schematic plan view of the dot image 70 according to the embodiment. As can be seen from the drawing, in a dot aggregation portion 72, both the "middle sizes" and the "small sizes" are arranged to be aggregated, while the "large sizes" are arranged to be dispersed. In other words, the dot aggregation portion 72 is formed through arrangement for dispersion of the dots 14 with the "large size" which is the largest dot size, and is formed through arrangement for aggregation of the dots 14 with the "small size" which is the smallest dot size.

In the single-pass-type image formation device using the recording heads 26 (FIG. 3) as the line heads, for example, by aggressively aggregating the dots 14 (FIG. 2) in a gray scale range of low concentration to medium concentration, robustness against specific stripe unevenness is enhanced in the single-pass-type image formation device. In contrast, as illustrated in FIG. 10B, the dots 14 are arranged such that the smaller the dot size thereof, the higher the aggregability thereof, and the larger the dot size thereof, the lower the aggregability thereof. Thereby, it is possible to reduce the size of the dot clusters which are likely to become large, and it is possible to further reduce noise and graininess of the image. The "aggregability" means a total amount of dots aggregated.

[Mathematical Features of Dot Images 10 and 12]

Subsequently, mathematical features of the dot images 10 and 12 (refer to FIGS. 1A and 1B) will be described with reference to FIGS. 11A to 17B. Here, the dot images 10 and 12 and the like may be appropriate for the dot image signals provided for image formation, and may be appropriate for image signals which are obtained by reading actually formed images through a scanner apparatus or the like.

<Example of AM-Type Halftone Dot Image>

FIGS. 11A to 12B schematically illustrate positions of the arranged dots 14 (refer to FIG. 2) that form a so-called AM-type halftone dot image.

Figure 11C:
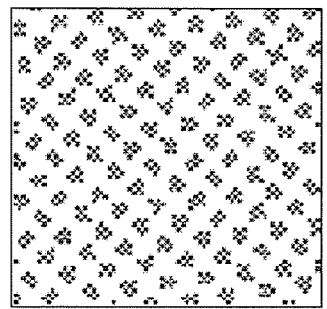
FIG. 11C is a dot pattern illustrating positions of "large size" dots arranged in the dot image of FIG. 1A.
Figure 11B:
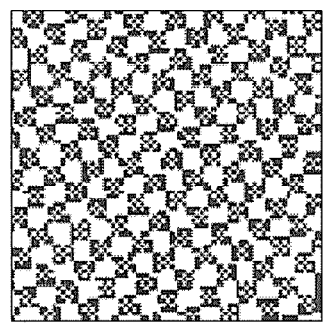
FIG. 11B is a dot pattern illustrating positions of "small size" dots arranged in the dot image of FIG. 1A.
Figure 11A:
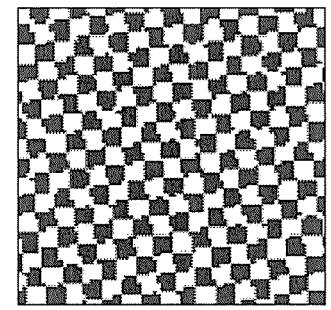
FIG. 11A is a dot pattern illustrating positions of arranged dots common to the dot images of FIGS. 1A and 20A.
Figure 20A:
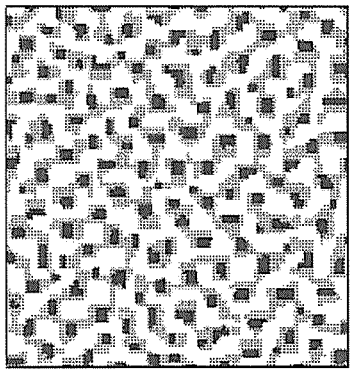
FIGS. 20A and 20B are schematic plan views of dot images which are respectively formed using image formation methods according to a conventional technique.

FIG. 11A is a dot pattern 80 illustrating positions of the arranged dots 14 (FIG. 2) common to the dot image 10 of FIG. 1A and the dot image 2 of FIG. 20A. The dot pattern 80 corresponds to a binary image that represents the pixels 64, which are hatched in the image region 62 illustrated in FIG. 8A, in black color (ON).

FIG. 11B is a dot pattern 10a illustrating positions of the "small size" dots 14S (FIG. 2) arranged in the dot image 10 of FIG. 1A. The dot pattern 10a corresponds to a binary image that represents the pixels 64, which are hatched in the image region 62 illustrated in FIG. 8B, in black color (ON). As can be seen from the shape of the dot pattern 10a, the "small size" dots 14S are arranged to be aggregated (or to be partially semi-aggregated).

FIG. 11C is a dot pattern 10b illustrating positions of the "large size" dots 14L (FIG. 2) arranged in the dot image 10 of FIG. 1A. The dot pattern 10b corresponds to a binary image that represents the pixels 64, which are hatched in the image region 62 illustrated in FIG. 8C, in black color (ON). As can be seen from the shape of the dot pattern 10b, the "large size" dots 14L are arranged to be semi-aggregated.

FIG. 12A is a dot pattern 2a illustrating positions of the "small size" dots 14S (FIG. 2) arranged in the dot image 2 of FIG. 20A. As can be seen from the shape of the dot pattern 2a, the "small size" dots 14S are arranged to be aggregated.

FIG. 12B is a dot pattern 2b illustrating positions of the "large size" dots 14L (FIG. 2) arranged in the dot image 2 of FIG. 20A. As can be seen from the shape of the dot pattern 2b, the "large size" dots 14L are arranged to be aggregated.

Subsequently, features of power spectrums (hereinafter simply referred to as spectrums) of the dot images 10 and 12 will be described. Here, aggregability of the dots 14 is defined on the basis of a power spectrum of a binary image in which whether or not each dot 14 with a specific dot size in the dot image 10 or the like is present is represented by a binary value.

Figure 13A:
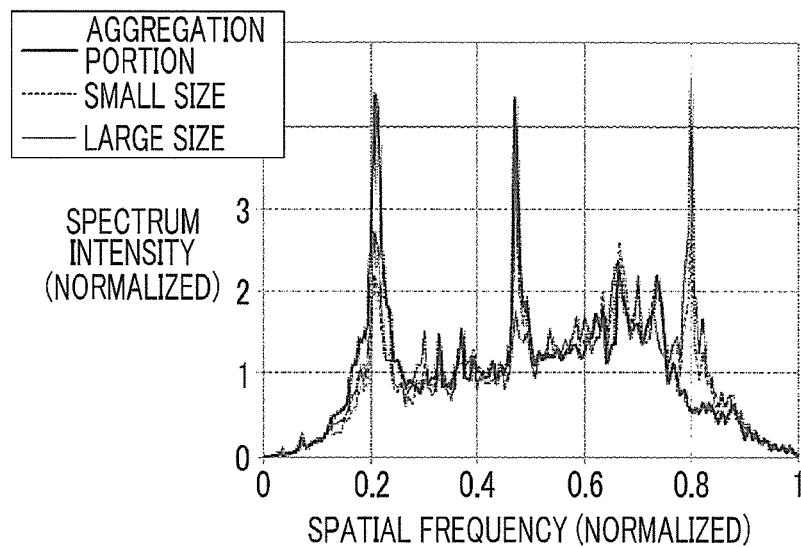
FIG. 13A is a graph illustrating power spectrums which are obtained by applying Fourier transform to the dot patterns of FIGS. 11A to 11C.

FIG. 13A is a graph illustrating power spectrums which are obtained by applying Fourier transform to the respective dot patterns 80, 10a, and 10b of FIGS. 11A to 11C. The horizontal axis of the graph indicates a normalized spatial frequency, and the vertical axis of the graph indicates a normalized spectrum intensity.

Values in the horizontal axis are linearly normalized such that the zero frequency corresponds to "0" and the Nyquist frequency corresponds to "1". Values in the vertical axis are linearly normalized such that a value of the integral of a power spectrum at the spatial frequency is set to 1. Definitions of the horizontal axis and the vertical axis are the same for FIGS. 13B, 16A, and 16B to be described later.

A graph (corresponds to the "aggregation portion") of the thick solid line indicates a spectrum intensity of the dot pattern 80 (FIG. 11A). This graph has two large peaks near the spatial frequencies of 0.21 and 0.48.

A graph (corresponds to the "small size") of the dashed line indicates a spectrum intensity of the dot pattern 10a (FIG. 11B). This graph has two peaks, of which values are slightly smaller than those of the "aggregation portion", at the spatial frequencies (near 0.21 and 0.48) which are substantially the same as those of the "aggregation portion". This graph further has one peak near the spatial frequency of 0.80.

A graph (corresponds to the "large size") of the thin solid line indicates a spectrum intensity of the dot pattern 10b (FIG. 11C). This graph has one large peak near the spatial frequency of 0.80. In addition, this graph further has two peaks near the spatial frequencies of 0.21 and 0.48, but values of the peaks are extremely small as compared with those of the "aggregation portion".

Figure 13B:
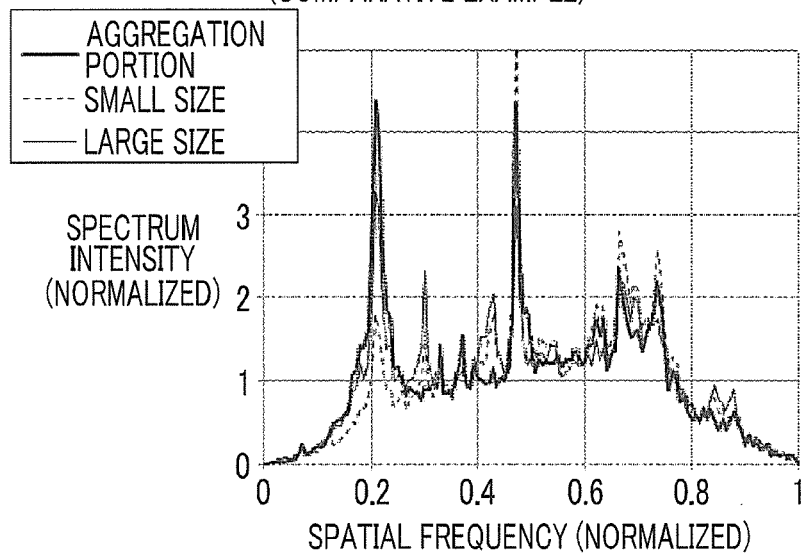
FIG. 13B is a graph illustrating power spectrums which are obtained by applying Fourier transform to the dot patterns of FIGS. 11A, 12A, and 12B.

FIG. 13B is a graph illustrating power spectrums which are obtained by applying Fourier transform to the dot patterns 80, 2a, and 2b of FIGS. 11A, 12A, and 12B. As can be seen from the drawing, any of graphs of the "aggregation portion", the "small size", and the "large size" has two large peaks near the spatial frequencies of 0.21 and 0.48.

<Example of FM-Type Halftone Dot Image>

FIGS. 14A to 15B schematically illustrate positions of the arranged dots 14 (refer to FIG. 2) that form a so-called FM-type halftone dot image.

Figure 14A:
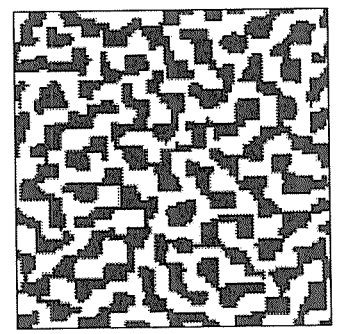
FIG. 14A is a dot pattern illustrating positions of arranged dots common to the dot images of FIGS. 1B and 20B.
Figure 20B:
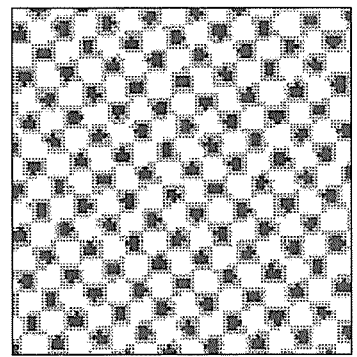

FIG. 14A is a dot pattern 82 illustrating positions of the arranged dots 14 (FIG. 2) common to the dot image 12 of FIG. 1B and the dot image 4 of FIG. 20B.

Figure 14B:
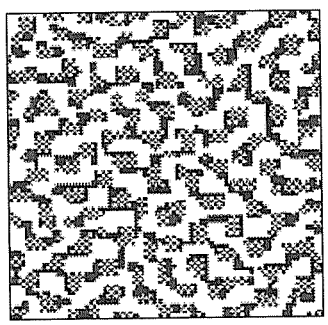
FIG. 14B is a dot pattern illustrating positions of "small size" dots arranged in the dot image of FIG. 1B.

FIG. 14B is a dot pattern 12a illustrating positions of the "small size" dots 14S (FIG. 2) arranged in the dot image 12 of FIG. 1B. As can be seen from the shape of the dot pattern 12a, the "small size" dots 14S are arranged to be aggregated (or to be partially semi-aggregated).

Figure 14C:
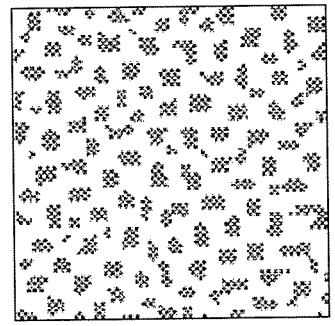
FIG. 14C is a dot pattern illustrating positions of "large size" dots arranged in the dot image of FIG. 1B.

FIG. 14C is a dot pattern 12b illustrating positions of the "large size" dots 14L (FIG. 2) arranged in the dot image 12 of FIG. 1B. As can be seen from the shape of the dot pattern 12b, the "large size" dots 14L are arranged to be semi-aggregated.

Figure 15B:
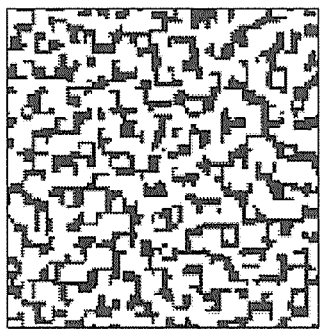
FIG. 15B is a dot pattern illustrating positions of "large size" dots arranged in the dot image of FIG. 20B.
Figure 15A:
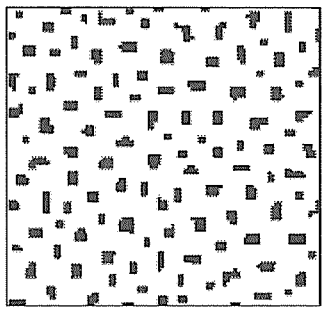
FIG. 15A is a dot pattern illustrating positions of "small size" dots arranged in the dot image of FIG. 20B.

FIG. 15A is a dot pattern 4a illustrating positions of the "small size" dots 14S (FIG. 2) arranged in the dot image 4 of FIG. 20B. As can be seen from the shape of the dot pattern 4a, the "small size" dots 14S are arranged to be aggregated.

FIG. 15B is a dot pattern 4b illustrating positions of the "large size" dots 14L (FIG. 2) arranged in the dot image 4 of FIG. 20B. As can be seen from the shape of the dot pattern 4b, the "large size" dots 14L are arranged to be aggregated.

Figure 16A:
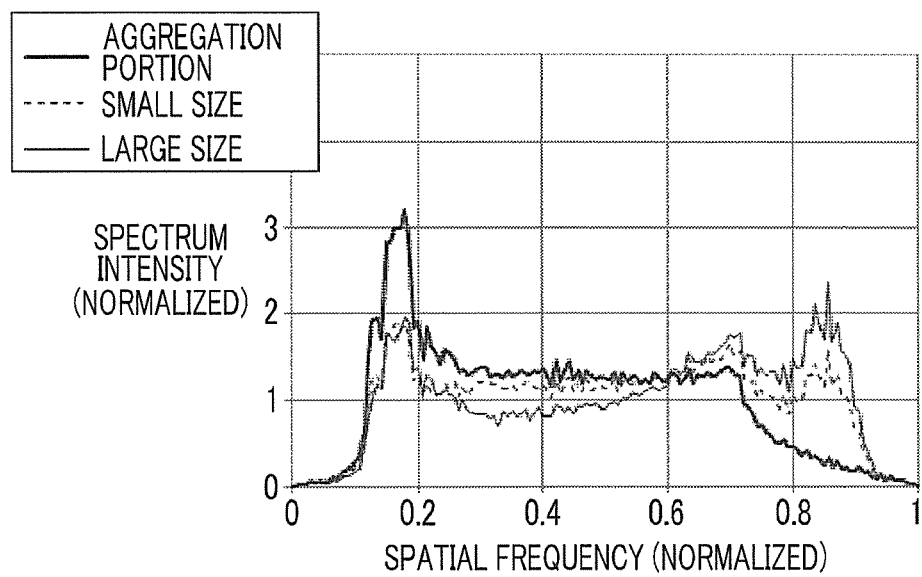
FIG. 16A is a graph illustrating power spectrums which are obtained by applying Fourier transform to the dot patterns of FIGS. 14A to 14C.

FIG. 16A is a graph illustrating power spectrums which are obtained by applying Fourier transform to the respective dot patterns 82, 12a, and 12b of FIGS. 14A to 14C.

A graph (corresponds to the "aggregation portion") of the thick solid line indicates a spectrum intensity of the dot pattern 82 (FIG. 14A). This graph has one large peak near the spatial frequency of 0.17.

A graph (corresponds to the "small size") of the dashed line indicates a spectrum intensity of the dot pattern 12a (FIG. 14B). This graph has one group of peaks, of which values are slightly smaller than those of the "aggregation portion", at the spatial frequency which is substantially the same as that of the "aggregation portion". This graph further has a spectrum component having a large width near the spatial frequency of 0.86.

A graph (corresponds to the "large size") of the thin solid line indicates a spectrum intensity of the dot pattern 12b (FIG. 14C). This graph has one group of large peaks near the spatial frequency of 0.86. In addition, this graph further has one group of peaks near the spatial frequency of 0.17, but values of the peaks are extremely small as compared with those of the "aggregation portion".

Figure 16B:
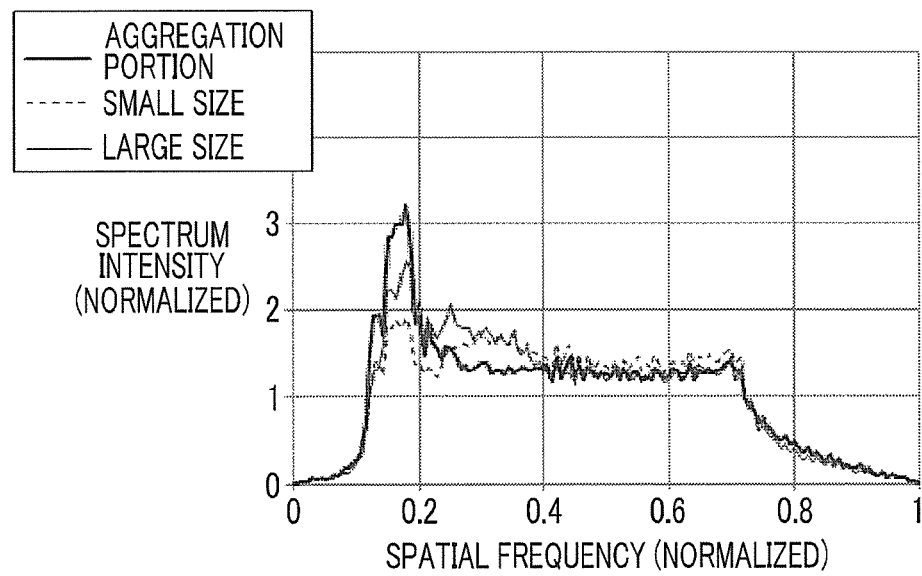
FIG. 16B is a graph illustrating power spectrums which are obtained by applying Fourier transform to the dot patterns of FIGS. 14A, 15A, and 15B.

FIG. 16B is a graph illustrating power spectrums which are obtained by applying Fourier transform to the dot patterns 82, 4a, and 4b of FIGS. 14A, 15A, and 15B. As can be seen from the drawing, any of graphs of the "aggregation portion", the "small size", and the "large size" has one large peak near the spatial frequency of 0.17.

<Features of Power Spectrums>

Figure 17A:
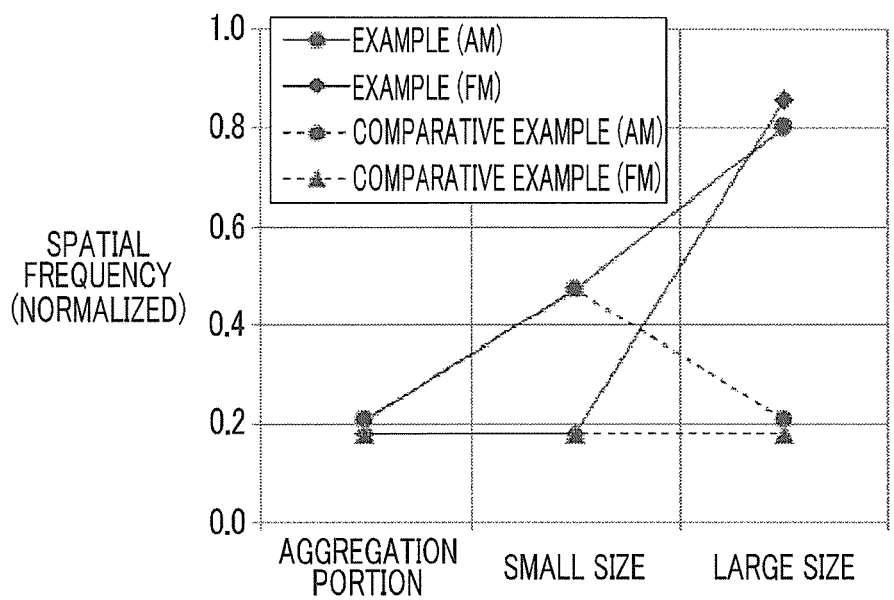
FIG. 17A is a graph illustrating peak frequencies of the power spectrums.

FIG. 17A is a graph illustrating peak frequencies of the power spectrums. The "peak frequency" means a spatial frequency corresponding to the maximum value of the power spectrum.

The "example (AM)" and the "example (FM)" in the present drawing and FIG. 17B to be described later respectively indicate characteristics of the dot image 10 of FIG. 1A and characteristics of the dot image 12 of FIG. 1B. Further, the "comparative example (AM)" and the "comparative example (FM)" in the present drawing and FIG. 17B respectively indicate characteristics of the dot image 2 of FIG. 20A and characteristics of the dot image 4 of FIG. 20B.

At the peak frequency of the "example (AM)", a relationship of "aggregation portion"<"small size"<"large size" is approximately satisfied. At the peak frequency of the "example (FM)", a relationship of "aggregation portion"="small size"<"large size" is approximately satisfied. At the peak frequency of the "comparative example (AM)", a relationship of "aggregation portion"="large size"<"small size" is approximately satisfied. At the peak frequency of the "comparative example (FM)", a relationship of "aggregation portion"="small size"="large size" is approximately satisfied.

As described above, in the dot images 10 and 12, the dots 14 are arranged such that the smaller the dot size thereof, the lower the spatial frequency (peak frequency), which corresponds to the maximum value of the power spectrum, and the larger the dot size thereof, the higher the spatial frequency.

Figure 17B:
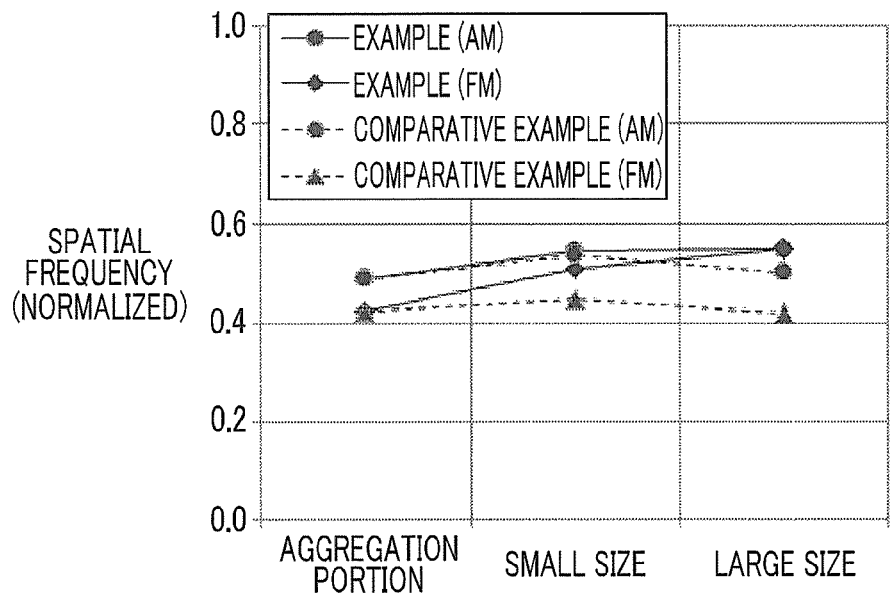
FIG. 17B is a graph illustrating centroid frequencies of the power spectrums.

FIG. 17B is a graph illustrating centroid frequencies of the power spectrums. The "centroid frequency" means a spatial frequency corresponding to a centroid (an average value of first moments) of the power spectrum.

At the centroid frequencies of the "example (AM)" and the "example (FM)", a relationship of "aggregation portion"<"small size"<"large size" is approximately satisfied. In contrast, at the centroid frequencies of the "comparative example (AM)" and the "comparative example (FM)", a relationship of "aggregation portion"="large size"<"small size" is approximately satisfied.

As described above, in the dot images 10 and 12, the dots 14 are arranged such that the smaller the dot size thereof, the lower the spatial frequency (centroid frequency), which corresponds to the centroid of the power spectrum, and the larger the dot size thereof, the higher the spatial frequency.

<Features of Attributes of Dots at Adjacent Positions>

Subsequently, feature of attributes of dots at adjacent positions in the dot images 10 and 12 will be described. Here, in the dot image 10, aggregability of the dots 14 is quantified on the basis of a proportion of absence of other dots 14 having the same dot size or dots 14 having sizes greater than that at the adjacent positions to the dots 14. Assuming that the adjacent positions are four closest positions, calculation is performed. As a result, it is possible to obtain the following results shown in Table 1.

TABLE 1

| Type of image | Small size | Large size |
| --- | --- | --- |
| Example (AM) | 0.286 | 1.000 |
| Example (FM) | 0.204 | 1.000 |
| Comparative example (AM) | 0.330 | 0.441 |
| Comparative example (FM) | 0.219 | 0.339 |

[Effects According to Image Formation Method]

According to the image formation method, there is provided a halftone processing section 34 that generates a dot image signal indicating states of the dots 14 by performing halftone processing on the continuous tone image signal indicating an image, and at least one of the dot aggregation portions 16, 18, 68, and 72 is formed on a part of the dot images 10, 12, 66, and 70 which are indicated by the dot image signals, through arrangement for aggregation of the dots 14 (dots 14L and 14S) with two or more dot sizes, when the continuous tone image signal is a signal indicating a tint image. In addition, the dot aggregation portions 16, 18, 68, and 72 are formed through arrangement for non-aggregation of the dots 14 (dots 14L) with at least one dot size. The halftone processing section 34 forms at least one of the dot aggregation portions 16, 18, 68, and 72 on a part of the dot images 10, 12, 66, and 70 which are indicated by the dot image signals, through arrangement for aggregation of the dots 14 (dots 14L and 14S) with two or more dot sizes. In addition, the halftone processing section 34 forms the dot aggregation portions 16, 18, 68, and 72 through arrangement for non-aggregation of dots 14 (dots 14L) with at least one dot size among the two or more dot sizes. In such a manner, halftone processing is performed on the continuous tone image signal.

As described above, at least one of the dot aggregation portion 16 and the like is formed through the arrangement for aggregation of the dots 14L and 14S with the two or more dot sizes, on a part of the dot image 10 or the like, and each of the dot aggregation portions 16 and the like is formed through the arrangement for non-aggregation of the dots 14L with at least one dot size. Therefore, sizes of clusters of dots with at least one dot size become small, and thus the shapes thereof becomes unlikely to be perceived by an observer. Thereby, it is possible to reduce noise and graininess of an image even when the dots 14 with the plurality of dot sizes are arranged to be aggregated.

[Modification Examples]

(1) In the above-described embodiment, the dot sizes are of two or three kinds, but the present invention is not limited to this, and the dot sizes may be of four or more kinds.

(2) In the above-described embodiment, color plates of CMYK or the like are not particularly described, and this difference may be taken into account. For example, the combinations and the kinds of the division information 44 and the threshold matrices 42 may be selected to be the same as described above without using the color plates, and may be selected to be different for each color plate.

(3) In the above-described embodiment, the halftone processing section 34 generates a dot image signal by using the systematic dithering method, but the present invention is not limited to this. For example, not only the systematic dithering method but also well-known techniques including an error diffusion method, a density pattern method, a random dot method, and the like may be adopted.

[Configuration of Image Formation Device 100]

Figure 18:
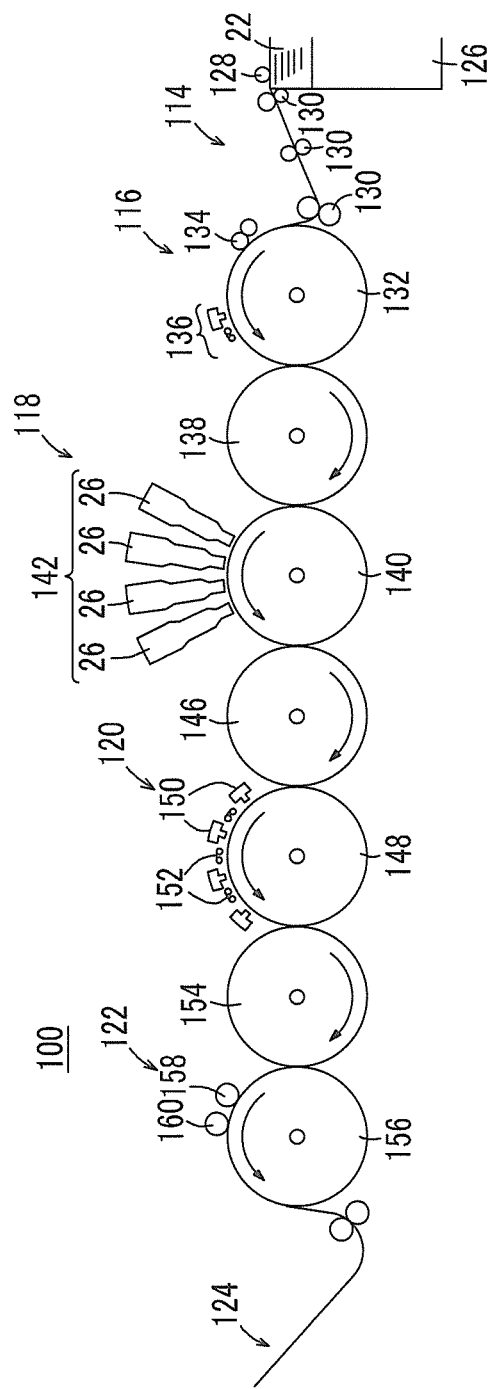
FIG. 18 is a cross-sectional side view illustrating a configuration of an image formation device.

Subsequently, a description will be given of the image formation device 100 capable of implementing the image formation method according to the above-described embodiment. FIG. 18 is a cross-sectional side view illustrating a configuration of the image formation device 100.

The image formation device 100 is provided with a sheet feeding and transport section 114 which feeds and transports the sheets 22 on the upstream side in the transport direction of the sheet 22 (cut sheets in this example of the drawing). The following components are provided on the downstream side of the sheet feeding and transport section 114 in the transport direction of the sheet 22: a treatment liquid application section 116 which applies a treatment liquid on a recording surface (hereinafter referred to as an image formation surface) of the sheet 22; an image formation section 118 which forms an image by adhering the liquid droplets 28 (refer to FIG. 3) of ink onto the image formation surface, an ink drying section 120 which dries ink of a treatment liquid layer formed on the sheet 22; an image fixing section 122 which fixes the image of the treatment liquid layer to the sheet 22; and a discharge section 124 which discharges the sheet 22 to which the image is fixed.

The sheet feeding and transport section 114 includes a stacking portion 126 which is provided so as to stack the sheets 22, a sheet feeding portion 128 which feeds the sheets 22 stacked on the stacking portion 126 one by one, and a transport portion 130 which transports the sheet 22 fed by the sheet feeding portion 128 to the treatment liquid application section 116.

The treatment liquid application section 116 includes a treatment liquid application drum 132 which is rotatably provided, a treatment liquid application device 134 which applies a treatment liquid on the image formation surface of the sheet 22, and a treatment liquid drying device 136 which dries the treatment liquid. Thereby, a thin treatment liquid layer is applied on the image formation surface of the sheet 22.

A first intermediate transport drum 138, which is rotatably provided, is disposed between the treatment liquid application section 116 and the image formation section 118. The first intermediate transport drum 138 is rotated in a state in which the sheet 22 is held on the surface of the first intermediate transport drum 138, and thus the sheet 22 supplied from the treatment liquid application section 116 side is transported to the image formation section 118 side.

The image formation section 118 includes an image formation drum 140 (transport portion) which is rotatably provided, and a head unit 142 which ejects the liquid droplets 28 onto the sheet 22 transported by the image formation drum 140. The head unit 142 includes the recording heads 26 of at least Y (yellow), M (magenta), C (cyan), and K (black) which are primary colors. In addition, the respective recording heads 26 are line heads arranged along the circumferential direction of the image formation drum 140. Thereby, images of the respective colors are sequentially formed on the treatment liquid layer applied on the image formation surface of the sheet 22. Further, the treatment liquid has an effect of condensing color materials (pigments) and latex particles dispersed in a solvent of the ink, and is thus able to prevent the color materials from flowing on the sheet 22.

A second intermediate transport drum 146, which is rotatably provided, is disposed between the image formation section 118 and the ink drying section 120. The second intermediate transport drum 146 is rotated in a state in which the sheet 22 is held on the surface of the second intermediate transport drum 146, and thus the sheet 22 supplied from the image formation section 118 side is transported to the ink drying section 120 side.

The ink drying section 120 includes an ink drying drum 148 which is rotatably provided, and a plurality of hot air nozzles 150 and a plurality of infrared heaters (heaters 152) which dry the treatment liquid layer of the sheet 22. With such a configuration, the solvent of the ink, which stays in the treatment liquid layer of the sheet 22, is dried.

A third intermediate transport drum 154, which is rotatably provided, is disposed between the ink drying section 120 and the image fixing section 122. The third intermediate transport drum 154 is rotated in a state in which the sheet 22 is held on the surface of the third intermediate transport drum 154, and thus the sheet 22 supplied from the ink drying section 120 side is transported to the image fixing section 122 side.

The image fixing section 122 includes an image fixing drum 156 which is rotatably provided, a heating roller 158 which is disposed so as to be close to the surface of the image fixing drum 156, and a fixing roller 160 which is disposed in a state where the roller is pressed in contact with the surface of the image fixing drum 156. Therefore, the latex particles condensed in the treatment liquid layer are heated and pressed so as to be melted, and are thus fixed as an image onto the sheet 22.

The sheet 22, onto which the image of the image formation surface is fixed through the above-described respective steps, is transported to the discharge section 124 side provided on the downstream side of the image fixing section 122 through rotation of the image fixing drum 156.

[Description of Control System of Image Formation Device 100]

Figure 19:
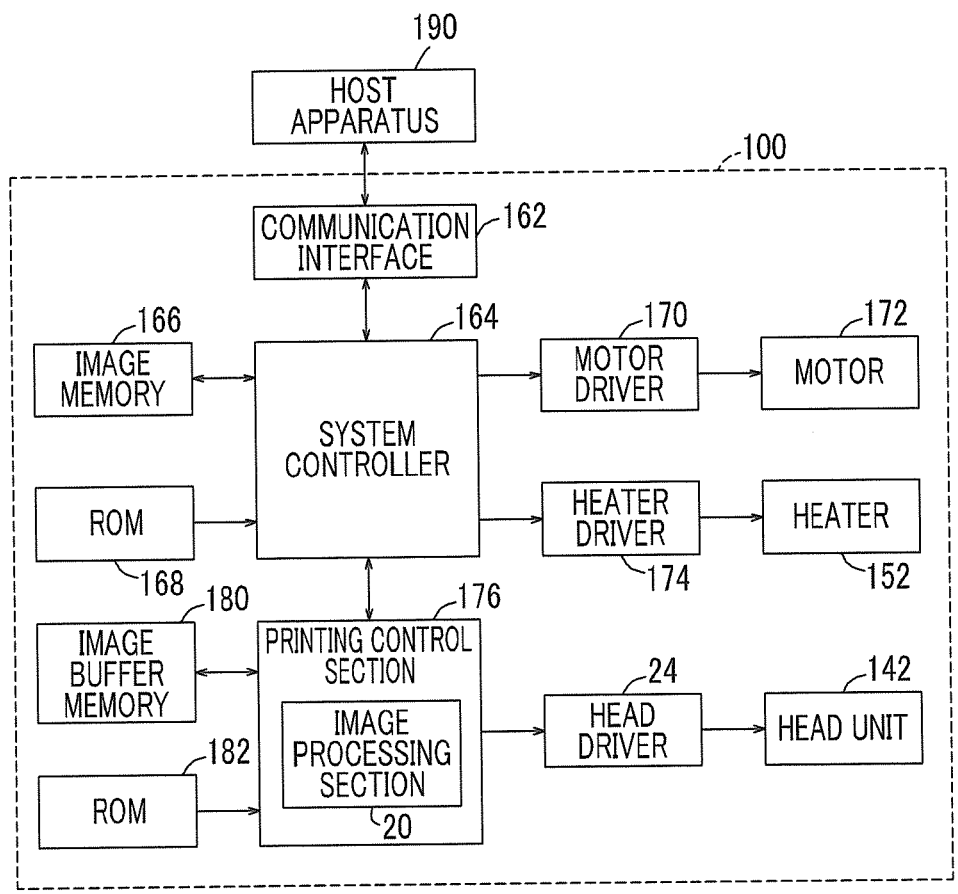
FIG. 19 is an electrical block diagram illustrating a system configuration of the image formation device illustrated in FIG. 18.

FIG. 19 is an electrical block diagram illustrating a system configuration of the image formation device 100 illustrated in FIG. 18. The image formation device 100 includes not only the head driver 24 (refer to FIG. 3), the head unit 142, and the heater 152 (refer to FIG. 18 with regard to both of the two), but also a communication interface 162, a system controller 164, an image memory 166, a ROM 168, a motor driver 170, a motor 172, a heater driver 174, a printing control section 176 (including the image processing section 20 of FIG. 3), an image buffer memory 180, and a ROM 182.

The communication interface 162 is a section that interfaces with a host apparatus 190, and is used for a user to instruct the image formation device 100 to form an image or the like. The communication interface 162 may employ a serial interface such as a universal serial bus (USB), IEEE1394, Ethernet (registered trademark), or a wireless network, or a parallel interface such as Centronics. A buffer memory, which is not illustrated, for speeding up communication may be mounted in this section.

An image signal, which is sent from the host apparatus 190, is received by the image formation device 100 through the communication interface 162, and is temporarily stored in the image memory 166. The image memory 166 is storage means for storing an image signal input through the communication interface 162, and reads and writes information through the system controller 164. The image memory 166 is not limited to a memory formed by semiconductor elements, and may use a magnetic medium such as a hard disk.

The system controller 164 includes a central processing unit (CPU) and peripheral circuits. The system controller 164 functions as a control device that controls the overall image formation device 100 in accordance with a predetermined program, and functions as a calculation device that performs various calculations. In other words, the system controller 164 controls the respective sections such as the communication interface 162, the image memory 166, the motor driver 170, and the heater driver 174. Further, the system controller 164 performs communication control with the host apparatus 190, reading and writing control of the image memory 166 and the ROM 168, and the like. Furthermore, the system controller 164 generates control signals for controlling the motor 172 and the heaters 152 of the sheet transport system. In addition, an image signal stored in the image memory 166 as well as the control signal is transmitted to the printing control section 176.

The ROM 168 stores programs, which are executed by the CPU of the system controller 164, and a variety of data which is necessary for control. The image memory 166 is used as a temporary storage region for an image signal and is used as a development region of a program and a calculation work region of the CPU.

The motor driver 170 is a driver (driving circuit) which drives the motor 172 of the sheet transport system in accordance with an instruction from the system controller 164. The heater driver 174 is a driver which drives the heaters 152 in accordance with an instruction from the system controller 164.

The printing control section 176 includes a CPU and peripheral circuits, and performs processes such as correction and various processings for generating an ejection control signal from the image signal within the image memory 166 under the control of the system controller 164. The image processing section 20 performs image processing including halftone processing on the input image signal, thereby generating a dot image signal, which indicates positions (ink ejection timing) of the formed dots 14, for each color plate.

The printing control section 176 has an ink ejection data generation function of generating ink ejection data (a control signal of the actuators corresponding to the nozzles of the head unit 142) on the basis of the dot image signal, which is generated by the image processing section 20, and a driving waveform generation function of generating driving signal waveforms for driving the actuators corresponding to the nozzles of the head unit 142.

The signal (driving waveform) generated in the printing control section 176 is supplied to the head driver 24 so as to control an ink ejection operation of the head unit 142. That is, the head driver 24 controls the head unit 142 such that it sequentially forms dots 14 in a state where the sheet 22 is moved relative to the head unit 142.

The printing control section 176 includes the image buffer memory 180, and an image signal or data such as parameters is temporarily stored in the image buffer memory 180 when the printing control section 176 processes the image signal.

The printing control section 176 is connected to the ROM 182 which stores programs executed by the CPU of the printing control section 176 and a variety of data which is necessary for control. The ROM 182 may be read only storage means, but preferably utilizes rewritable storage means such as an EEPROM in a case where a variety of data is updated as necessary.

It should be noted that, in FIG. 19, the image processing section 20 is included in the printing control section 176. For example, the image processing section 20 may be formed as an apparatus (for example, a computer) separate from the printing control section 176 or the system controller 164.

It should be noted that the present invention is not limited to the above-described embodiment, and can be freely modified without departing from the scope of the invention.

For example, various types of a mechanism for ejecting the liquid droplets 28 through the recording head 26 may be employed. A type ejecting liquid droplets of ink through deformation of actuators formed by for example piezoelectric elements or the like may be employed. Further, a thermal jet type may be employed in which a heating element such as a heater heats ink so as to generate bubbles and the liquid droplets are ejected by a pressure thereof. The recording head 26 is not limited to the line head, and may be applied to a multi-pass type image formation device that forms an image while reciprocating the head to scan the sheet 22 in the width direction (the X direction of FIG. 3).

In the above-described embodiment, the ink-jet-type image formation device is exemplified, but the present invention is not limited to this. Thus, the present invention can be applied to any type (for example, an electrophotographic type) which forms dots 14 on a recording medium.

In the above-described embodiment, a wide format printing apparatus is exemplified, but the scope of the present invention is not limited to this. It may be possible to apply the present invention to image formation devices other than the wide format printing apparatus. Further, the present invention is not limited to the graphic art (printing) application. The present invention can be applied to various image formation devices capable of forming an image pattern, such as a wire drawing apparatus of an electronic circuit board, a manufacturing device of various devices, a resist printing apparatus using a resin liquid as a functional liquid for ejection, and a micro-structure forming apparatus.

What is claimed is:

1. An image formation device that forms an image formed of dots in which multiple dot sizes are mixed, the image formation device comprising
    a halftone processing section that generates a dot image signal, which indicates states of dots, by performing halftone processing on a continuous tone image signal which indicates the image,
    wherein when the continuous tone image signal is a signal indicating a tint image,
        an image processing section configured to generate at least one dot aggregation portion which is formed through for aggregation of dots with at least two different dot sizes of the multiple dot sizes, on a part of a dot image which is indicated by the dot image signal, and also through non-aggregation of dots with at least one other dot size of the multiple dot sizes; the non-aggregation dots are not formed by aggregating multiple dots.

2. The image formation device according to claim 1,
    wherein the arrangement for aggregation is arrangement in which the dots are aggregated so as to be adjacent at respective closest positions where the dots are closest, and
    wherein the arrangement for non-aggregation is at least either of arrangement for semi-aggregation, in which the dots are aggregated so as to be adjacent at second closest positions where the dots are second closest relative to the closest positions, or arrangement for dispersion in which the dots are respectively present at positions farther than the second closest positions.

3. The image formation device according to claim 2,
    wherein the dot aggregation portion is formed through the arrangement for dispersion of the dots with a largest dot size.

4. The image formation device according to claim 2,
    wherein the dot aggregation portion is formed through the arrangement for aggregation of the dots with a smallest dot size.

5. The image formation device according to claim 3,
    wherein the dot aggregation portion is formed through the arrangement for aggregation of the dots with a smallest dot size.

6. The image formation device according to claim 1,
    wherein in the dot aggregation portion, the dots are arranged such that the smaller a dot size of the dots, the higher the aggregability of the dots, and the larger the dot size of the dots, the lower the aggregability of the dots.

7. The image formation device according to claim 2,
    wherein in the dot aggregation portion, the dots are arranged such that the smaller a dot size of the dots, the higher the aggregability of the dots, and the larger the dot size of the dots, the lower the aggregability of the dots.

8. The image formation device according to claim 3,
    wherein in the dot aggregation portion, the dots are arranged such that the smaller a dot size of the dots, the higher the aggregability of the dots, and the larger the dot size of the dots, the lower the aggregability of the dots.

9. The image formation device according to claim 4, wherein in the dot aggregation portion, the dots are arranged such that the smaller a dot size of the dots, the higher the aggregability of the dots, and the larger the dot size of the dots, the lower the aggregability of the dots.

10. The image formation device according to claim 5, wherein in the dot aggregation portion, the dots are arranged such that the smaller a dot size of the dots, the higher the aggregability of the dots, and the larger the dot size of the dots, the lower the aggregability of the dots.

11. The image formation device according to claim 6, wherein the aggregability is defined on the basis of a power spectrum of a binary image in which whether or not each dot with a specific dot size in the dot image is present is represented by a binary value, and wherein in the dot image, the dots are arranged such that the smaller a dot size of the dots, the lower a spatial frequency, which corresponds to a maximum value of the power spectrum, and the larger a dot size of the dots, the higher the spatial frequency.

12. The image formation device according to claim 6, wherein the aggregability is defined on the basis of a power spectrum of a binary image in which whether or not each dot with a specific dot size in the dot image is present is represented by a binary value, and wherein in the dot image, the dots are arranged such that the smaller a dot size of the dots, the lower a spatial frequency, which corresponds to a centroid of the power spectrum, and the larger a dot size of the dots, the higher the spatial frequency.

13. The image formation device according to claim 1, further comprising:
a recording head that forms dots with a plurality of dot sizes on a recording medium; and
a head driving circuit that controls the recording head such that the recording head sequentially forms dots, on the basis of the dot image signal which is generated by the halftone processing section, under a condition where the recording medium is moved relative to the recording head.

14. The image formation device according to claim 2, further comprising:
a recording head that foul's dots with a plurality of dot sizes on a recording medium; and
a head driving circuit that controls the recording head such that the recording head sequentially forms dots, on the basis of the dot image signal which is generated by the halftone processing section, under a condition where the recording medium is moved relative to the recording head.

15. The image formation device according to claim 3, further comprising:
a recording head that forms dots with a plurality of dot sizes on a recording medium; and
a head driving circuit that controls the recording head such that the recording head sequentially forms dots, on the basis of the dot image signal which is generated by the halftone processing section, under a condition where the recording medium is moved relative to the recording head.

16. The image formation device according to claim 4, further comprising:
a recording head that forms dots with a plurality of dot sizes on a recording medium; and
a head driving circuit that controls the recording head such that the recording head sequentially forms dots, on the basis of the dot image signal which is generated by the halftone processing section, under a condition where the recording medium is moved relative to the recording head.

17. The image formation device according to claim 5, further comprising:
a recording head that forms dots with a plurality of dot sizes on a recording medium; and
a head driving circuit that controls the recording head such that the recording head sequentially forms dots, on the basis of the dot image signal which is generated by the halftone processing section, under a condition where the recording medium is moved relative to the recording head.

18. An image formation method for using the image formation device according to claim 1 that forms an image formed of dots in which multiple dot sizes are mixed, the image formation method comprising
generating a dot image signal, which indicates states of dots, by performing halftone processing on a continuous tone image signal which indicates the image,
wherein when the continuous tone image signal is a signal indicating a tint image,
at least one dot aggregation portion is formed through arrangement for aggregation of dots with two or more dot sizes, on a part of a dot image which is indicated by the dot image signal, and
the dot aggregation portion is formed through arrangement for non-aggregation of dots with at least one dot size.

19. A non-transitory recording medium storing program for causing the image formation device according to claim 1, which forms an image formed of dots in which multiple dot sizes are mixed, to execute
generating a dot image signal, which indicates states of dots, by performing halftone processing on a continuous tone image signal which indicates the image,
wherein when the continuous tone image signal is a signal indicating a tint image,
at least one dot aggregation portion is formed through arrangement for aggregation of dots with two or more dot sizes, on a part of a dot image which is indicated by the dot image signal, and
the dot aggregation portion is formed through arrangement for non-aggregation of dots with at least one dot size.

20. An image foaming product,
wherein an image is formed on a recording medium by using the image formation device according to claim 13.

21. An image formation device that forms an image formed of dots in which multiple dot sizes are mixed, the image formation device comprising
a halftone processing section that generates a dot image signal, which indicates states of dots, by performing halftone processing on a continuous tone image signal which indicates the image,
wherein when the continuous tone image signal is a signal indicating a tint image,
an image processing section configured to generate at least one dot aggregation portion which is formed through aggregation of dots with at least two different dot sizes of the multiple dot sizes, on a part of a dot image which is indicated by the dot image signal, and also through non-aggregation of dots with at least one other dot size of the multiple dot sizes, the dot aggregation portion is further formed through aggregation of the dots with at least two of the other of the multiple dot sizes.

* * * * *